Sept. 10, 1957    A. W. GAUBATZ    2,806,075
THERMOCOUPLE
Filed July 27, 1954
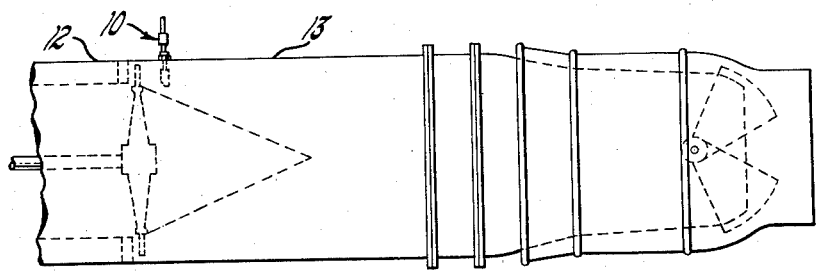
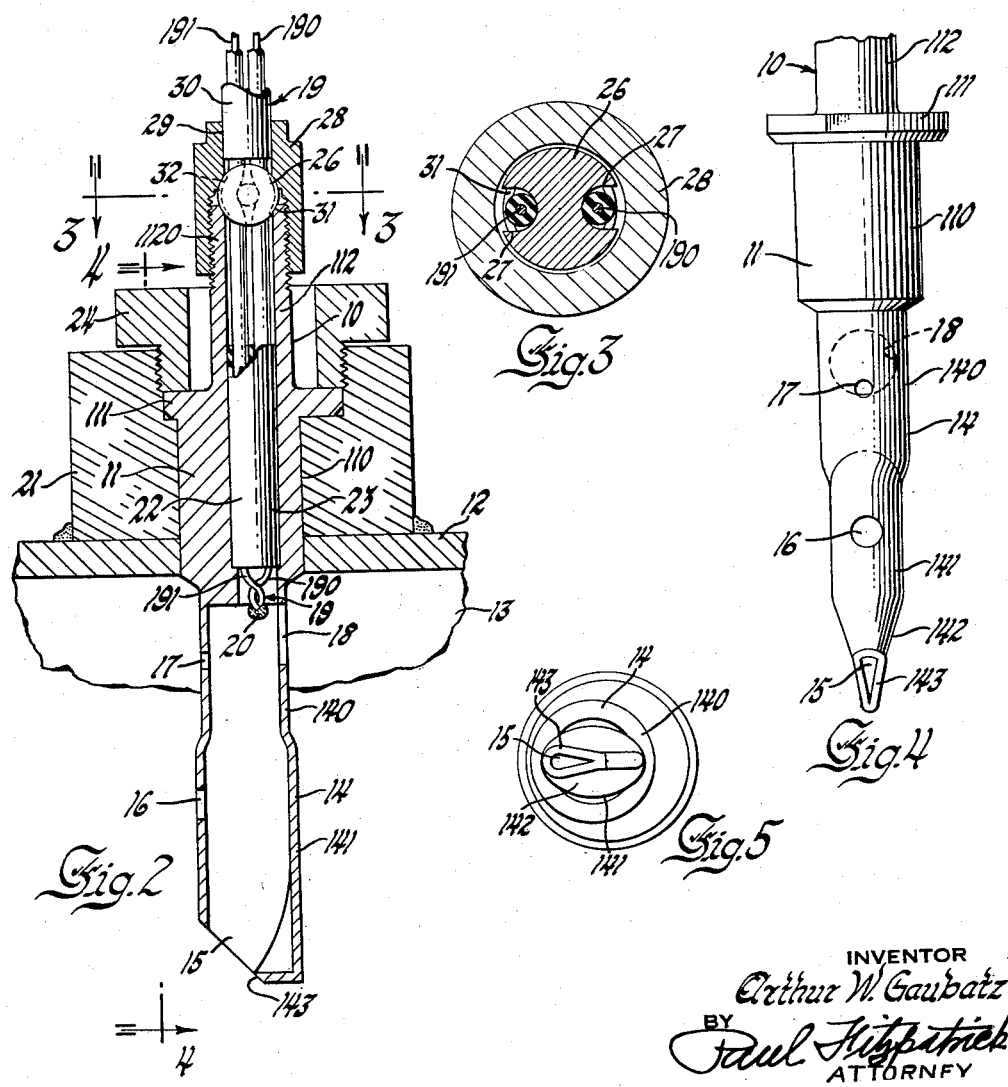
INVENTOR
Arthur W. Gaubatz
BY Paul Fitzpatrick
ATTORNEY

United States Patent Office 2,806,075
Patented Sept. 10, 1957

2,806,075

THERMOCOUPLE

Arthur W. Gaubatz, Indianapolis, Ind., assignor to General Motors Corporation, Detroit, Mich., a corporation of Delaware Application July 27, 1954, Serial No. 445,995

8 Claims. (Cl. 136—4)

This invention relates to thermocouple type gas probes and in particular to improved sampling gas probes for measuring the temperature of hot gases as they pass at relatively high velocities through gas ducts.

To measure the temperatures of hot gases passing through a gas duct such as the tail pipe of a gas turbine engine, a thermocouple is generally placed in the path of the gases and the E. M. F. produced thereby is employed to indicate the temperature of the gases. Of great importance is the location where gas samples are taken, the location of the thermocouple with respect to gases passing through the probe, and the means employed to mix and direct the gas samples to the thermocouple.

One object of the invention is to provide an improved thermocouple type gas probe for measuring the temperature of gases passing through a gas duct which samples the gases and directs them to the thermocouple element in a manner to assure accurate gas temperature readings.

Another object of the invention is to provide a thermocouple type gas probe including a gas inlet and a gas outlet wherein the junction of the thermocouple wires is readily positioned at the desired point within the gas probe.

Another object of the invention is to provide a thermocouple type gas probe having a gas passage therethrough arranged to mix effectively a plurality of gas samples taken at several places within a high velocity gas duct and accurately reflect the temperature of the mixture passing therethrough.

Other objects of the invention will become apparent by reference to the following detailed description taken in connection with the accompanying drawing, in which:

Fig. 1 is a more or less diagrammatic view indicating a gas probe embodying the invention mounted through the tail pipe of gas turbine engine.

Fig. 2 is an enlarged horizontal sectional view showing the construction of the gas probe indicated in Fig. 1.

Fig. 3 is a further enlarged sectional view taken on the line 3—3 of Fig. 2.

Fig. 4 is an upstream elevational view indicating the shape of the gas collector tube portion of the particular embodiment of the invention disclosed.

Fig. 5 is an inner end elevational view of the gas collector tube.

Referring now to the drawing wherein like numerals refer to like and corresponding parts throughout the several views, the gas probe 10 shown therein for the purpose of illustrating the invention comprises, in general, a body portion 11 securable through the wall 12 of a gas turbine or other gas duct 13, a gas collector tube 14 extending from said body portion 11 into the gas duct 13 having therein spaced upstream inlet apertures 15, 16 and 17 and a downstream outlet aperture 18 located adjacent the body portion 11, a thermocouple 19 extending through said body portion 11 with the junction 20 of the thermocouple wires 190 and 191 disposed in longitudinal adjustable relationship with respect to the gas collector tube 14 and the downstream outlet aperture 18 therein.

The gas probe body portion is composed of a barrel 110 and an eccentric seating flange 111 and stem 112 extending therefrom. The body 110 extends through a bore in a boss 21 welded to the casing 12 and the eccentric flange seats in an eccentric bore in the boss to orient the thermocouple correctly with regard to the direction of gas flow. The body is retained by a nut 24 threaded into the boss concentric with flange 111.

The thermocouple 19 preferably extends through an insulator 22 positioned in a shouldered aperture 23 in the body portion 11, which shouldered aperture 23 is eccentric in respect to the threaded barrel 110 and the gas collector tube 14 and is concentric in respect to the flange 111 and stem 112. This construction permits proper upstream-downstream orientation of the gas collector tube 14 when the gas probe is mounted through the wall of a gas duct with the thermocouple junction 20 in its prefered location adjacent the gas outlet 18 of the gas collector tube 14.

The gas collector tube 14 is preferably formed cylindrical in shape at 140 adjacent the body portion 11 and has a more or less eliptical outer portion 141 which is tapered at its outer end 142 and diagonally formed at 143 to provide the outer diagonally disposed upstream intake aperture 15. The other upstream intake aperture 16 and 17 are suitably spaced along the gas collector tube 14 and are of such size as may be selected to accomplish the desired sampling of gas passing through the gas duct 13, the mixing of the gas samples in the gas collector tube 14, and the discharge of the samples out of the downstream outlet aperture 18. Obviously, the shape of the gas collector tube 14 and precise number and arrangement of the upstream intake apertures may be varied to suit different conditions under which the gas probe 10 is employed; however, it is desirable that the downstream outlet aperture 18 be located near the inner end of the gas collector tube 14 adjacent the body portion 11 and that the junction 20 of the thermocouple 19 be positioned in longitudinally adjustable relationship with respect to the downstream outlet aperture 18.

The stem 112 of the body portion 11 through which the shouldered aperture 23 extends serves as a passage for the thermocouple wires 190 and 191 which are anchored in the desired longitudinal relationship with respect to the body portion 11 by means of a deformable ball type clamping element 26 having a pair of grooves 27 therein to receive the thermocouple wires 190 and 191 as indicated in Fig. 3 which shows the deformable clamping element 26 before being squeezed into engagement with the thermocouple wires.

The stem 112 is externally threaded at its outer end at 1120 to receive an internally shouldered and threaded cap 28 having a longitudinal aperture 29 therethrough to accommodate the thermocouple cable 30 into which the thermocouple wires 190 and 191 are molded. The outer annular end of the stem 112 is provided with an internally beveled seat 31 and the inner annular portion of the cap 28 is provided with an internally beveled seat 32 between which the deformable clamping element 26 is squeezed by the threading of the cap 28 onto the stem 112 whereby to engage the thermocouple wires 190 and 191 and anchor them in the precise desired longitudinal relationship so that the thermocouple junction 20 may be placed in the most effective location in respect to the gas outlet 18 of the gas collector tube 14. Although but a single embodiment of the invention has been disclosed and described in detail, it is obvious that many changes may be made in the size, shape, arrangement and construction thereof without departing from the spirit and scope of the appended claims:

I claim:

1. A gas probe comprising a body portion adapted to be disposed through the wall of a gas duct and a gas collector tube extending therefrom into said duct normal to the flow of gases therethrough, said gas collector tube being reduced in size outwardly from said body portion and having a downstream gas outlet adjacent said body portion, an upstream inlet opening at the outer end thereof and a plurality of upstream inlet openings spaced inwardly toward the body portion therefrom, and thermocouple wires supported in insulated relationship in said body portion and secured together to form an exposed junction at the inner end of said gas collector tube adjacent said gas outlet therein.

2. A gas probe comprising a body portion adapted to be disposed through the wall of a gas duct and a gas collector tube extending therefrom into said duct normal to the flow of gases therethrough, said gas collector tube being reduced in size outwardly from said body portion and having therein a downstream gas outlet adjacent said body portion, an upstream inlet opening inclined to the axis of the tube and the direction of gas flow at the outer end thereof, a series of inlet openings diminishing in size toward said body portion and spaced between the outer end of the gas collector tube and the body portion, and thermocouple wires supported in insulated relationship in said body portion and secured together to form an exposed junction at the inner end of said gas collector tube eccentric thereto and adjacent said gas outlet therein.

3. A gas probe comprising a body portion adapted to be supported by the wall of a gas duct and a gas collector tube extending therefrom into said gas duct, said gas collector tube having a downstream gas outlet therein adjacent the body portion and a number of upstream inlets spaced longitudinally thereof arranged to assure a mixture of gas samples taken at different points in said duct, said body portion having a shouldered bore therethrough communicating with said gas collector tube and forming a seat adjacent said tube, an insulator having a pair of longitudinal apertures therethrough positioned in said bore against said seat, thermocouple wires disposed through said bore and insulator and secured together at their ends to form an exposed junction at the gas outlet of said gas collector tube, and means for anchoring said thermocouple wires in assembled relationship within said body portion.

4. A gas probe comprising a body portion adapted to be supported by the wall of a gas duct and a gas collector tube extending therefrom into said gas duct, said gas collector tube having a downstream gas outlet adjacent the body portion and an upstream gas inlet located to sample gas passing through said duct, said body portion having a bore therethrough communicating with said gas collector tube, an insulator having a pair of longitudinal apertures therethrough positioned in said bore, thermocouple wires disposed through said bore and insulator and secured together at their ends to form an exposed junction at the inner end of said gas collector tube, the outer end of said body member being formed to provide an annular seat, a deformable spherical anchor element grooved to receive said thermocouple wires and positioned therebetween, and an annularly seated sleeve on said body member for engaging and deforming said anchor element between said seats to engage and fix said thermocouple wires in assembled relationship within said body portion with the exposed junction in a selected position with respect to the gas outlet of said gas collector tube.

5. A gas probe comprising a body portion adapted to be supported by the wall of a gas duct and a gas collector tube extending therefrom into said gas duct, said gas collector tube having a downstream gas outlet adjacent the body portion and a plurality of upstream gas inlets spaced longitudinally thereof arranged to assure a mixture of gas samples taken at different points in said duct, said body portion having a shouldered bore therethrough communicating with said gas collector tube and forming a seat adjacent said tube, an insulator having a pair of longitudinal apertures therethrough positioned in said bore against said seat, thermocouple wires disposed through said bore and insulator and secured together at their ends to form an exposed junction at the inner end of said gas collector tube, the outer end of said body member being formed to provide an annular anchor receiving seat, a deformable spherical anchor element grooved to slidably receive said thermocouple wires and positioned therebetween, and an annularly seated sleeve on said body member for engaging and deforming said anchor element between said seats to fix said thermocouple wires in assembled relationship within said body portion with the exposed junction in a selected position with respect to the gas outlet of said gas collector tube.

6. A gas probe comprising a body portion adapted to be supported by the wall of a gas duct and a gas collector tube extending therefrom into said gas duct, said gas collector tube having a plurality of upstream gas sampling inlets spaced longitudinally thereof and a downstream gas outlet adjacent said body portion sized and arranged to mix gas samples entering said inlets and passing through said tube to said outlet, said body portion having a bore therethrough communicating with said gas collector tube, thermocouple wires disposed in insulated relationship through said bore and secured together at their ends to form an exposed junction at the inner end of said gas collector tube, and means for anchoring said thermocouple wires in assembled relationship within said body portion with the exposed junction in a selected position in said gas collector tube.

7. A gas probe comprising a body portion adapted to be disposed through the wall of a gas duct and a gas collector tube extending therefrom into said duct normal to the flow of gases therethrough, said gas collector tube being reduced in size outwardly from said body portion and having a downstream gas outlet adjacent said body portion, a first upstream inlet opening inclined to the axis of the tube and the direction of gas flow at the outer end thereof remote from said body portion and a second inlet opening between the first inlet and the body portion, and thermocouple wires supported in insulated relationship in said body portion and secured together to form an exposed junction at the inner end of said gas collector tube adjacent said gas outlet therein.

8. A thermocouple comprising a hollow body adapted to be mounted on the wall of a gas duct and including a tubular portion extending therefrom and adapted to extend into said duct, the tubular portion having at least one upstream inlet and a downstream outlet defined thereby, thermocouple wires extending through said body into said tubular portion and terminating in a thermocouple junction, and a seal in said body portion including a deformable element disposed in said body and means for compressing said deformable element against the wires, the deformable element being adapted to engage and seal against said wires along a portion of the length thereof and grip said wires to secure them in place over a range of positions of the wires, so constructed and arranged that the junction may be adjusted through a range of positions in the gas collector portion.

References Cited in the file of this patent

UNITED STATES PATENTS

| | | |
|---|---|---|
| 2,496,774 | Buck | Feb. 7, 1950 |
| 2,496,806 | Moffatt | Feb. 7, 1950 |
| 2,496,835 | Ward | Feb. 7, 1950 |
| 2,536,037 | Clousing et al. | Jan. 2, 1951 |
| 2,653,983 | Best | Sept. 29, 1953 |